(12) United States Patent
Talaalout et al.

(10) Patent No.: US 8,014,951 B2
(45) Date of Patent: Sep. 6, 2011

(54) SURFACE POINTING TECHNIQUES

(75) Inventors: Abdelkrim Talaalout, Cachan (FR); Dominique Doledec, Antony (FR)

(73) Assignee: CGGVeritas Services SA, Massy (FR)

( * ) Notice: Subject to any disclaimer, the term of this patent is extended or adjusted under 35 U.S.C. 154(b) by 1387 days.

(21) Appl. No.: 10/482,583

(22) PCT Filed: Jul. 1, 2002

(86) PCT No.: PCT/FR02/02278
§ 371 (c)(1),
(2), (4) Date: Dec. 24, 2003

(87) PCT Pub. No.: WO03/003052
PCT Pub. Date: Jan. 9, 2003

(65) Prior Publication Data
US 2004/0172198 A1    Sep. 2, 2004

(30) Foreign Application Priority Data
Jun. 29, 2001   (FR) ...................................... 01 08703

(51) Int. Cl.
*G01V 1/00*   (2006.01)
(52) U.S. Cl. ........................................................ 702/18
(58) Field of Classification Search ................ 702/1–18; 367/36; 345/166; 600/245; 703/5, 10
See application file for complete search history.

(56) References Cited

U.S. PATENT DOCUMENTS

| | | | | |
|---|---|---|---|---|
| 1,240,328 A * | 9/1917 | Fessenden | ....................... | 367/36 |
| 1,730,411 A * | 10/1929 | Dorsey | .......................... | 367/135 |
| 2,329,721 A * | 9/1943 | Christie et al. | ................... | 367/55 |
| 2,388,703 A * | 11/1945 | Peterson | .......................... | 367/36 |
| 3,529,282 A * | 9/1970 | Blake et al. | ...................... | 367/61 |
| 4,849,887 A * | 7/1989 | Skylas | ............................. | 702/18 |
| 5,008,861 A * | 4/1991 | Gallagher | ........................ | 367/59 |
| 5,458,126 A * | 10/1995 | Cline et al. | ..................... | 600/425 |
| 5,537,320 A | 7/1996 | Simpson et al. | ................. | 702/14 |
| 5,615,171 A | 3/1997 | Hildebrand | ..................... | 367/72 |
| 5,771,170 A * | 6/1998 | Withers et al. | .................. | 702/16 |
| 5,793,357 A * | 8/1998 | Ivey et al. | ...................... | 345/166 |
| 6,041,018 A * | 3/2000 | Roche | ............................. | 367/46 |
| 6,640,190 B2 * | 10/2003 | Nickel | ............................. | 702/14 |
| 6,826,483 B1 * | 11/2004 | Anderson et al. | ............... | 702/13 |

FOREIGN PATENT DOCUMENTS

FR             2657695         8/1991
WO       WO 99/67660       12/1999

* cited by examiner

*Primary Examiner* — Aditya Bhat
(74) *Attorney, Agent, or Firm* — Potomac Patent Group PLLC

(57) ABSTRACT

A method for processing seismic data, characterized in that with a view to analyzing them as a function of at least four dimensions. Picking and/or picking propagation is carried out on at least one subset of data which corresponds to a collection of data sampled in three or two dimensions. The quantity or quantities which correspond to the other dimension or dimensions are fixed values. In applying a given projection law to at least one of the points highlighted by the picking and/or picking propagation to determine a point that corresponds to it in another subset corresponding to a collection of data sampled in the same dimensions for a different value of at least one quantity that corresponds to at least one other dimension.

13 Claims, 5 Drawing Sheets

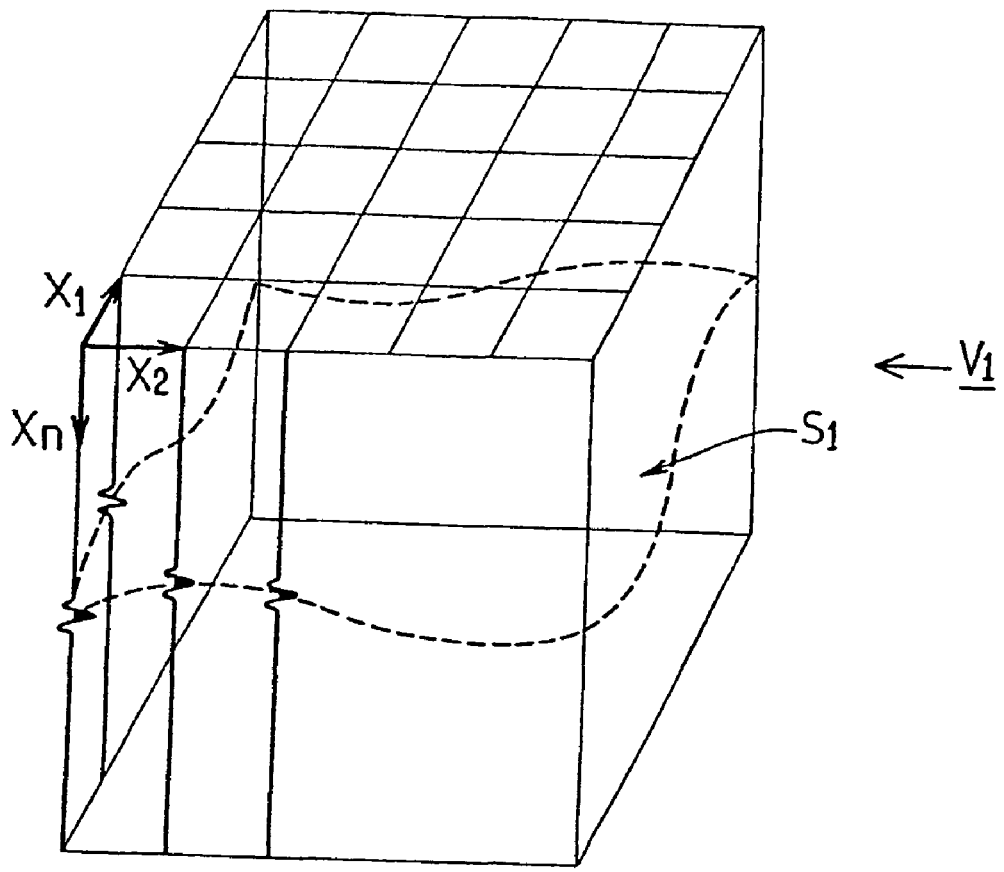
FIG_1
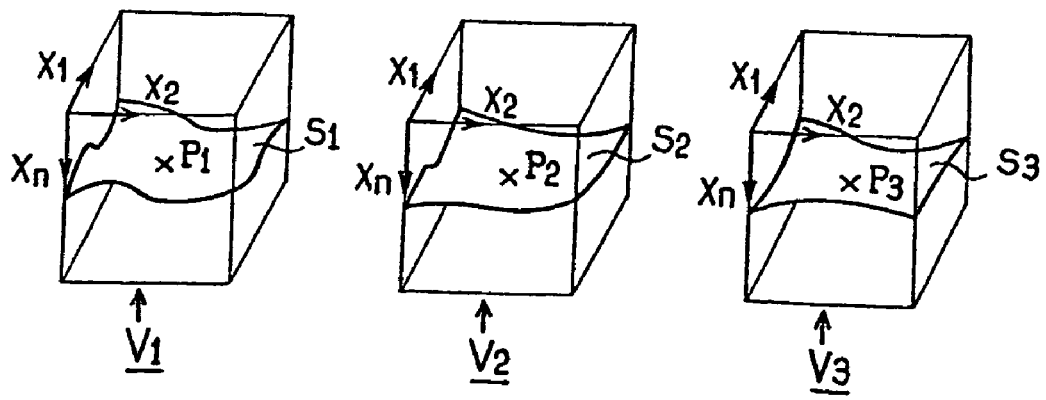
FIG_2

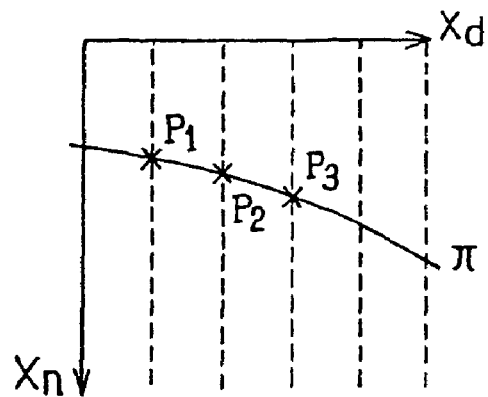
FIG_3
Case n = 4
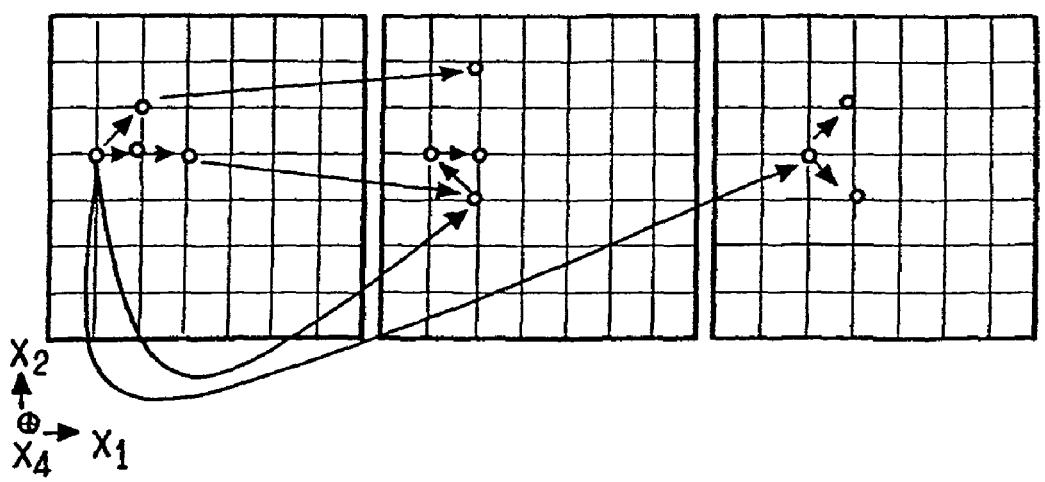
FIG_4

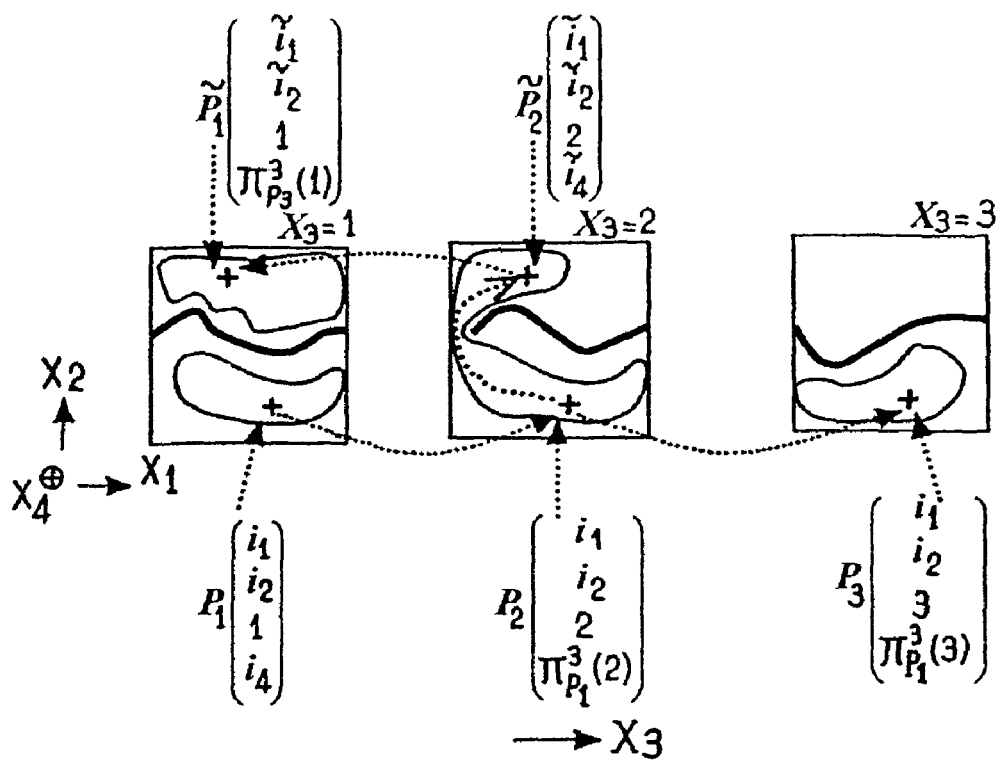
FIG_5
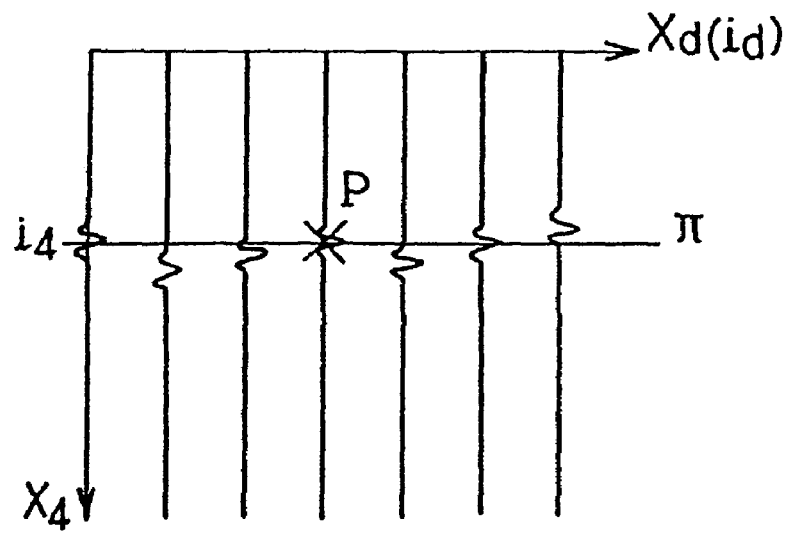
FIG_6

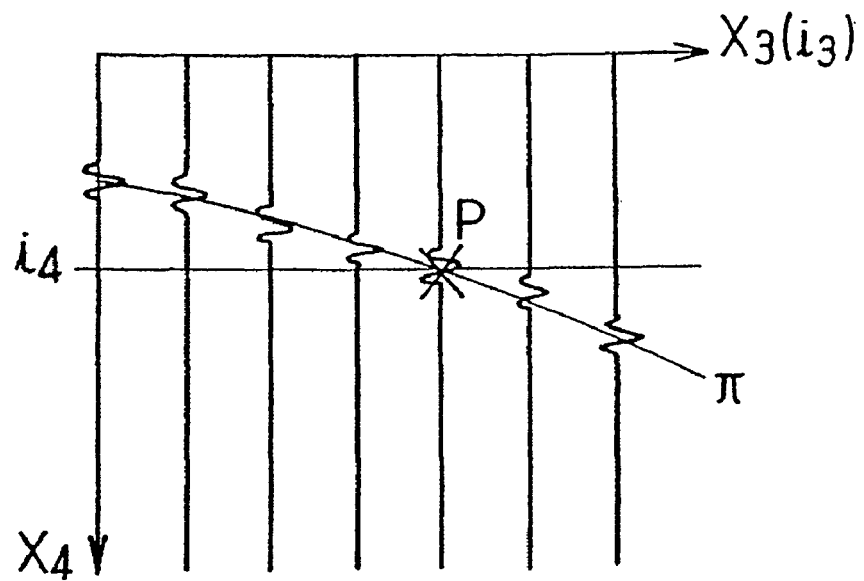
FIG_7
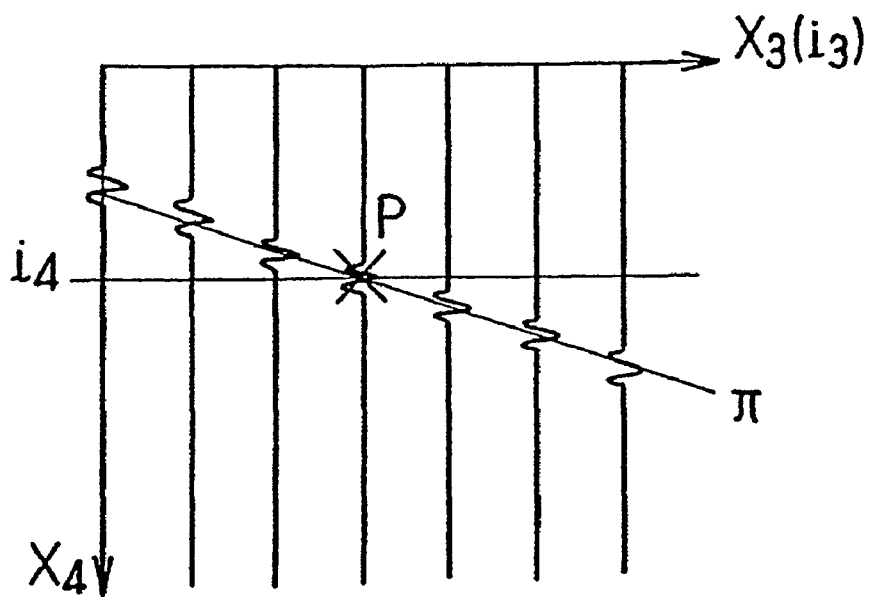
FIG_8

SURFACE POINTING TECHNIQUES

The present patent application is a non-provisional application of International Application No. PCT/FR02/02278, filed Jul. 1, 2002.

BACKGROUND

1. Field

The present invention relates to improvements to the surface picking techniques used in seismic processing.

2. Description of the Related Art

In the field of earth sciences, geophysicists use "seismic reflection" techniques in order to image the structure of the subsoil.

These consist of emitting acoustic signals at the surface of the ground, and in recording them after 10 their successive reflections at the boundaries of the geological strata.

These strata constitute the subsoil, a geometrical model of which is intended to be created.

One of the methods most commonly used in order 15 to do this, especially when prospecting for oil deposits, is the "3D acquisition" method.

This consists of distributing emitters and receivers in a horizontal surface plane along a grid of coordinates X, Y.

The result of such a method is a three-dimensional image of the subsoil, organized the form of recordings sampled as a function of time or depth, denoted Z.

Each of these recordings, which is referred to 25 as a "trace", is a representation of the vertical in line with a point $P_{ij}$ with the coordinates $X_i$, $Y_j$.

Such three-dimensional acquisition makes it possible to obtain a volume, the dimensions of which are two geometrical axes X, Y and one axis for the time or the acquisition depth Z.

In addition to these spatial dimensions (X, Y and the vertical axis Z), many other quantities are of interest to physicists, in particular:

The source/receiver distance or the angle of incidence which was used to generate the volume. Until recently, this distance (offset) was most often reduced to 0 and the volumes were obtained by adding contributions with a constant distance, so as to increase the signal/noise ratio. Partial summation by classes of offset or angle now allows geophysicists to carry out analyses by class of distance or angle.

Time. A plurality of seismic acquisitions can be carried out successively in time with the same network of receivers/emitters; comparison of the acquired data makes it possible, for example, to understand the variation of a fluid regime in the case of reservoir exploitation.

The type of seismic-waves.—The sensors can simultaneously record compression waves (P waves) and shear waves (S waves); the ratio between the arrival times of these two types of waves is a direct link with the nature of the medium through which the waves are propagating.

Velocity. Time or depth migration consists of shifting the points of the acquisition volume while taking a velocity field into account. The velocity used in these processes may be perturbed and constitute an extra analysis dimension. In order to update a velocity model, for example, the Applicant has proposed an approach in which perturbation factors are regularly distributed over a velocity model and, for a position X, Y, the value of the sample associated with the same reflector in each of the migrated cubes is addressed.

etc.

It is of fundamental importance to take these other quantities into account in many fields of geoscience, from velocity analysis to reservoir characterization.

This is now feasible by virtue of the increase in computer processing power and storage capacities; analysis and interpretation tools suitable for this new approach have yet to be provided.

When a quantity in addition to the three spatial dimensions, in which seismic volumes are generally represented, is currently taken into account with existing tools, the interpretation of the data is equivalent to the sum of the interpretations carried out independently on each of the 3D seismic volumes obtained for different values of said quantity.

Document WO 99/67660 describes a method for monitoring the variations of the subsoil. This method consists of determining a displacement field with which it is possible to convert from a sampled volume of seismic data, measured at a time T, to a field of seismic data measured at a subsequent time T, to a field of seismic data measured at a subsequent time T. The displacement field determined in this way is applied to the first seismic volume, so as to obtain an image of the subsoil.

The information which can be derived from such a way of interpretation is necessarily limited.

The invention itself provides a effective and original contribution to the resolution of this problem.

One technique conventionally used for the analysis of 3D seismic volumes is that of surface picking, an example of which is given in Patent FR 2 657 695. That document relates to a method for surface picking in a three-dimensional volume, according to which a volume representing the values of a sampled parameter is transformed into a two-dimensional image by using a Peano-Hilbert curve, and a automatic picking program is applied to the 2D image which is obtained.

When an extra parameter is taken into account in addition to the spatial dimensions which constitute the 3D volumes (X, Y and vertical axis) and said quantity is varied, one difficulty is due to the fact that the nature and the shape of the reflector to be interpreted may change from one volume to another, along the dimension constituted by said quantity.

Coherence between the various 3D volumes is not necessarily inherent in the mapped sample, which leads to selection problems in respect of the events interpreted by geophysicists. This may lead to discontinuities or aberrations in the surface picking.

SUMMARY

The invention makes it possible to overcome the drawbacks of the prior art. It allows interpretations taking account of all the parameters to be analyzed, and taking into account the laws which characterize them.

The tool which it provides furthermore makes it possible to validate the coherence of the analyses which are carried out, with respect to the physical laws on which the quantities being taken into account depend.

To this end, it provides a method for processing seismic data as claimed in claim 1.

According to this method, with a view to analyzing them as a function of at least four dimensions, picking and/or picking propagation is carried out on at least one subset of these data which corresponds to a collection of these data sampled in three or two dimensions, in which case the quantity or quantities which correspond to the other dimension or dimensions are fixed values, then in applying a given projection law to at least one of the points highlighted by this picking and/or picking propagation, in order to determine a point which corresponds to it in another subset corresponding to a collection of data sampled in the same dimensions, for a different value of at least one quantity which corresponds to at least one other dimension.

The term "projection law" means a law intended to connect the points of one of the subsets to those of another, this law being a function of the modifications which are made to the quantity or quantities corresponding to the dimensions other than those in which said subsets are represented.

Examples of projection laws are given in more detail below.

Advantageously, picking propagation is carried out from at least one projected point in some other subset.

In particular, and preferably, an alternating succession of picking propagations and projections is carried out.

Also advantageously, an inverse projection law is applied to at least one of the pointes determined by picking propagation in some other subset, in order to determine a point which corresponds to it in at least one subset from which a projection was carried out.

Also, a coherence test is preferably carried out on a projected point in order to validate it.

In particular, mapping is displayed for the points which have been pointed and/or projected and/or determined by picking propagation in the various subsets in question.

A quantity which is varied in order to define another dimension is advantageously a source/receiver offset and/or an angle of incidence and/or an acquisition time and/or a type of seismic wave and/or a migration velocity and/or a parameter taking at least one of these parameters into account.

Particularly preferably, the number of dimensions taken into account is more than four.

The invention also relates to a method for mapping determination on seismic data, characterized in that the aforementioned method is used in order to determine mapping in at least four dimensions.

Advantageously, in particular, a neighborhood of points is determined from a point which has been projected and/or pointed and/or determined by picking propagation, which includes one or more points projected from said point into other subsets, in addition to the points in a predetermined neighborhood of said point in the subset of dimensions two or three to which said point belongs, and in that out of all points of this neighborhood, the one of these points which optimizes a given criterion is determined.

Put another way, a method is provided for interpreting the seismic data in a space of dimension greater than three, the first two dimensions being advantageously, but without implying any limitation, the spatial dimensions (X, Y and vertical axis).

One characteristic of this method is that it alternates phases of propagation, i.e. of mapping the surfaces in the 3D space (X, Y and vertical axis, for example), and phases of projection during which the intent is to move the sample in another dimension, all other things being equal.

Furthermore, the propagation in the space of the spatial dimensions can resume once an acceptable position—that is to say one that fulfills a set of validation criteria with regard to the original sample—for the sample has been found in the N-dimensional space, the remaining (N-3) dimensions being frozen again.

All the samples validated during these alternations of propagation and projection phases are mapped alongside the progress of the algorithm for mapping the hyper-surface in the N-dimensional space.

BRIEF DESCRIPTION OF THE DRAWINGS

Other characteristics and advantages of the invention will become more readily apparent from the following description, which is purely illustrative and does not imply any limitation and should be read with reference to the appended figures, in which:

FIG. 1 is a representation of a three-dimensional volume in which various obtained seismic traces have been pointed, FIG. 2 represents three-dimensional volumes $v_1$, $v_2$ and $v_3$ corresponding to different values of a parameter Xd, FIG. 3 illustrates an example of a surface picking guide, FIGS. 4 and 5 illustrate examples of picking propagation in three three-dimensional volumes $v_1$, $v_2$ and $v_3$, FIGS. 6 to 8 illustrate examples of surface picking guides.

DETAILED DESCRIPTION

Figure 9:
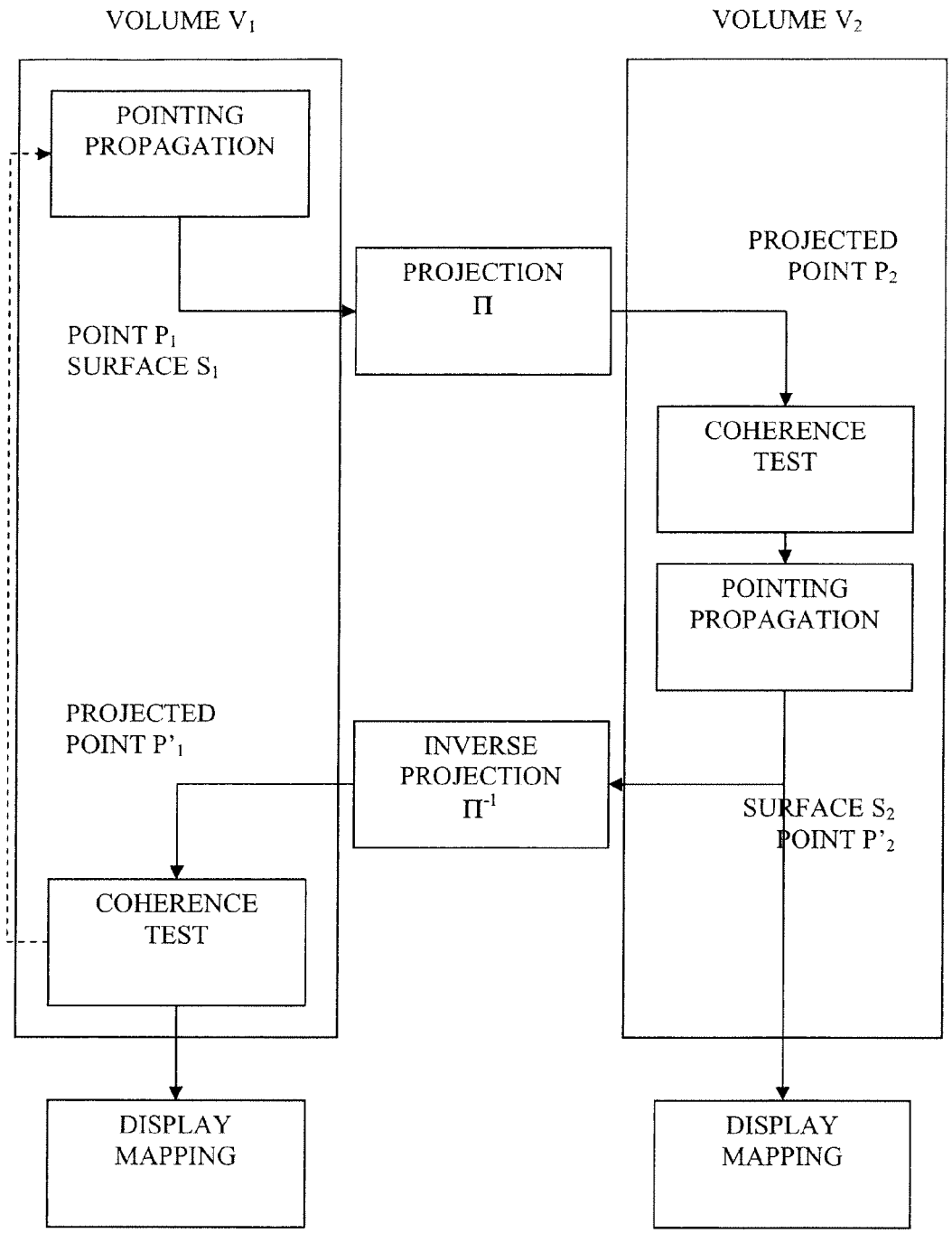
FIG. 9 illustrates a block diagram of a process for processing seismic data.

The rest of the text makes the assumption that a set of seismic traces has been acquired during one or more campaigns of recording, for example 3D recording.

These recordings are processed in order to be usable in data form (for example, but not necessarily, the values of amplitudes of the recorded waves) depending on a number "N" of parameters, which may very well be greater than 3.

These parameters are referred to as $x_1$, $x_2$, xn in the rest of the text. They may correspond to the geometrical dimensions X, Y, Z (position and depth or time) and/or to any other quantities which are intended to be taken into account for analyzing the recordings that are available: source/receiver distance, angle of incidence, inter-acquisition time, wave type, velocity model increment, etc.

In a first step, three of these parameters ($x_i$, $x_2$ . . . xn, for example) are selected in order to define three dimensions of a three-dimensional subspace, on which conventional 3D mapping can be carried out if the other parameters are fixed.

The data which are considered are in general collections of 3D seismic data, each generated for a given value of one or more other parameters that are varied in order to define the extra dimensions.

Mapping can be carried out for each 3D volume obtained in this way, for example by surface picking.

FIG. 1 illustrates an example of surface picking (surface Si) carried out on such a volume of VI.

One or more so-called projection or "surface picking guide" relations are furthermore defined, which are intended to connect the points of one of these volumes to those of another, as a function of the modifications which are made to the parameters other than those (xi, x2 . . . xn) that correspond to the dimensions in which these volumes are represented, in order to convert from one of these two volumes to the other.

These picking guides may be determined in various ways, and in particular, in addition to as a function of the values of the samples in question, also as a function of dynamic or kinematic descriptions of the variation of the volumes in the directions corresponding to the modified parameters.

The picking guides may also be laws which are given empirically.

FIGS. 2 and 3 illustrate an example of what a picking guide may be.

$v_1$, $v_2$ and $v_3$ correspond to three 3D volumes giving collections of samples as a function of the three same parameters x1, $x_2$ . . . x, for three different values of another parameter Xd (the term "value" being intended here in the broad sense; X may correspond equally well to a quantifiable parameter, and to a parameter expressing a condition other than a quantified condition (type of waves: P waves, S waves, etc.)).

If $S_1$ is a surface pointed around the point $P_1$ in the volume, a surface picking guide is for example a curve (Π in FIG. 3)

which makes it possible to associate points $P_2$ and $P_3$, which theoretically describe the same event in the volumes $v_2$ and $v_3$ for the same values of $X_1$, $X_2$, with a point $P_1$ of surface picking in the volume $v_1$ in the plane (P, Xd, X1).

Considered a surface S associated with the n-dimensional volume. It is defined by:

$$\forall (i_1, \ldots, i_{n-1}) \in [1, \ldots N_1] \times \ldots \times [1, \ldots N_{n-1}]$$

$$i_n = \begin{vmatrix} S(i_1, \ldots, i_{n-1}) \\ \text{or} \\ U_d \text{ if the point does not exist or is not defined} \end{vmatrix}$$

Let $P(i_1, \ldots, i_n)$ be a point of the surface S and d be direction other than those forming the predefined 3D volume.

A surface picking guide associated with P in a direction d is an application $\Pi_p^d$, which makes it possible to determine some of the points belonging to S lying in the neighborhood of P in the plane defined by (P, $X_d$, $X_n$).

If it is known how to define the application $\Pi$ for a point P in this direction d, it is known how to extend the surface S from P in this direction. The dimension of the neighborhood is thus increased in the propagation method by the direction number other than those forming the predefined 3D volume, where an application $\Pi$ can be defined.

The application $\Pi$ describes a curve representing the projection of the image described by S into the plane (P, $X_d$, $X_n$). The curve is defined by segments connecting the correlant extrema of S from a column to the other in the plane (P, $X_d$, Xn). Let R denote the application connecting two neighboring points of S by a segment. The inverse relation $R^{-1}$ is then applied so as to transform the segment into elementary surface elements.

The application $\Pi$ thus makes it possible to convert from one 3D volume to another, in order to point events in correspondence, with regard to the selected propagation criteria, in one volume then in another.

Coherence tests are advantageously provided in order to validate the points which are picked from the volumes into which projection is carried out with the aid of the guide $\Pi$: calculation of similarity and/or cross-correlation, for example.

It will be understood that the technique which has just been described makes it possible successively to carry out surface picking in a first volume, convert to a second volume with a picking guide, then resume surface picking in the latter.

Multiplying combinations of this type from a pointed sample, in order to achieve complete mapping of the event throughout the space.

In the case of an analysis taking 4 dimensions into account, FIG. 4 in this regard illustrates combinations of conventional 2D or 3D surface picking (small arrows on the grids) with propagation guides for converting from one 3D volume to another.

This example illustrates a case in which four parameters are coupled, one of these parameters being that which is varied in order to convert from one volume to another.

It is of course possible to take a much larger number of parameters into account and to vary several parameters. It is also possible to change the parameters which define the dimensions of the 3D volumes, in which the conventional surface picking techniques are carried out.

As illustrated by FIG. 5, for example, the proposed techniques are used in order to circumvent a discontinuity (referenced by D) preventing the continuation of surface picking in a volume.

For instance, in the example illustrated in said FIG. 5, the surface point is carried out in a volume of dimension $X_1$, $X_2$, $X_4$. A discontinuity D prevents this surface picking from being carried out throughout this volume. One or more points highlighted by the surface picking are then projected into one or more other volumes, corresponding to one or more other values for a fourth parameter ($X_3$ in this case).

Conventional surface picking can again be carried out in each of these other volumes, so as to circumvent the fault before returning to the first volume by an inverse projection from a point highlighted by one of these surface pickings performed in one of these other volumes (points $\tilde{P}_2$ and $\tilde{P}_1$).

Some examples of possible surface picking guides are given below.

Example 1

Offset-corrected three-dimensional seismics are considered, $X_1$ and $X_2$ being dimensions corresponding to the surface position parameter, $X_3$ corresponding to the offset parameter and $X_4$ corresponding to the corrected time. A surface picking guide in the direction $X_3$ may be:

$$\Pi_p^3(j) = \text{Adj}(i_4)$$

where Adj is the adjustment function for the signal on the current trace of a point of the surface and where $i_4$ is a value sampled in the direction $X_4$.

Example 2

The seismic volume, represented in two directions $X_1$, $X_2$, corresponding to the position on the ground parameter, is considered, which is derived from an acquisition in which the source/receiver distance is sampled regularly with a pitch $\Delta_3$. $X_3$ represents the offset distance and $X_4$ the time, sampled with a pitch $\Delta_4$.

A velocity map $V(i_1, i_2)$, propagation velocity of the wave out the point $(i_1, i_2, i_3)$ of the subsoil, is available for the reflector to be mapped. If Adj denotes the adjustment function of the signal on the current trace of a point of the surface, use of Dix's law makes it possible to define a propagation guide for a point $P(i_1, i_2, i_3, i_4)$ of the surface, in the offset direction $X_3$ by the function (represented in FIG. 6)

$$\Pi_P^3(j) = Adj\left(\sqrt{(i_4)^2 \times (\Delta_4)^2 + \frac{(j^2 - (i_3)^2) \times (\Delta_3)^2}{v(i_1, i_2)^2}}\right)$$

Here, the surface picking guide depends on the average velocity in the subsoil, which is a parameter external to the volume which is intended to be imaged. This parameter provides description information in the direction $X_3$.

Example 3

In the scope of updating a velocity model by the velocity scan method, the initial velocity is varied by a perturbation factor $\alpha$. After the various depth migrations, n seismic volumes sampled in the direction $X_3$ corresponding to the perturbation factor $i_3 = \alpha$ are obtained. Since the velocity perturbation is linear, it may be assumed to first approximation that for a position $X_1$, $X_2$, the depth $X_4$ of the sample associated with a reflector varies linearly from one seismic volume to another in the direction $X_3$. The surface picking guide is therefore defined as a linear function (represented in FIG. 3) of the type $$\Pi_P^3(j) = Adj\left(\left(i_4 + \frac{j-i_3}{i_3}\right) \times \Delta_3\right)$$

where $\Delta_3$ is the sampling pitch in the direction $X_3$.

The picking guide is corrected as the pickings are being projected from one seismic volume to another and a the obtained pickings are being validated, so that it is coherent with the pickings which are obtained. For example, each new picking in a three-dimensional volume constitutes a new picking guide Π. The picking guide Π may be modified by interpolation or regression, so that it corresponds to the points which are obtained. In certain cases, this can make it possible to create the picking guide incrementally, or to derive certain variables external to the volume V therefrom, which are analytically quantifiable and provide descriptive information about the relations between the surface points in one or more of the directions.

As will have been understood, the proposed technique makes it possible to take existing 2D and 3D propagation methods into account, and to extend them to "volumes" of dimension 4 or greater.

The number of possible extension paths is thus increased, especially for surface picking.

It will be noted that the projection relations, or picking guides, may depend equally well on information describing the dynamics or the kinematics of the seismic environment and on empirical information obtained from samples of the acquisition, or external information.

The invention claimed is:

1. A method for processing seismic data, comprising:
   analyzing in a processor seismic data as a function of at least four dimensions corresponding to parameters x1, x2, xn and xd,
   defining plural three dimensional volumes based on parameters x1, x2, and xn, wherein each three dimensional volume corresponds to a different value of the parameter xd, wherein each three dimensional volume includes one subset of the seismic data,
   performing data picking propagation in one three dimensional volume on at least one subset of the seismic data which corresponds to a collection of the seismic data sampled in three or two dimensions, in which case the quantity or quantities of other data which correspond to the other dimension or dimensions are fixed values,
   applying a predetermined projection law to at least one of the points highlighted by the data picking in the one three dimensional volume propagation to determine a point in another three dimensional volume which corresponds to the highlighted point in another subset corresponding to a collection of seismic data sampled in the same dimensions, for a different value of the parameter xd, wherein an image of a subsoil is generated.

2. The method as claimed in claim 1, wherein data picking propagation is carried out from at least one projected point resulting from applying the given projection law in some other subset.

3. The method as claimed in claim 2, wherein an inverse projection law is applied to at least one of the points determined by data picking propagation in some other subset, in order to determine a point which corresponds to it in at least one subset from which a projection was carried out.

4. The method as claimed in one of claim 1 or claim 2, wherein an alternating succession of data picking propagation and applying the given projection law is carried out.

5. The method as claimed in claim 1, wherein a coherence test is carried out on a projected point in order to validate it.

6. The method as claimed in claim 1, further comprising displaying mapping of points.

7. The method as claimed in claim 1, wherein a parameter modified from one subset to another is a source/receiver offset and/or an angle of incidence and/or an acquisition time and/or a type of seismic wave and/or a migration velocity and/or a parameter taking at least one of these parameters into account.

8. The method as claimed in claim 1, wherein the number of dimensions taken into account is more than four.

9. The method as claimed in claim 1, further comprising determining mapping on seismic data in at least four dimensions.

10. The method as claimed in claim 9, wherein a neighborhood of points is determined from a point which has been projected and/or pointed and/or determined by picking propagation, which includes one or more points projected from said point into other subsets, in addition to the points in a predetermined neighborhood of said point in the subset of dimensions two or three to which said point belongs, and in that out of all points of this neighborhood, the one of these points which optimizes a given criterion is determined.

11. The method as claimed in claim 1, wherein the case of offset-corrected three-dimensional seismic data, the dimensions taken into account comprise two dimensions corresponding to the surface position parameters $(X_1, X_2)$, one dimension $(X_3)$ corresponding to the offset parameter and one dimension $(X_4)$ corresponding to the corrected time, and in that a law for propagation in the direction corresponding to the offset parameter $(X_3)$ is:

$$\Pi_{p,}^3(j) = \text{Adj}(i_4)$$

where Adj is the adjustment function for the signal on the current trace of a point of the surface and where $i_4$ is a value sampled in the dimension $(X_4)$ corresponding to the corrected time.

12. The method as claimed in claim 1, wherein the dimensions taken into account comprise two dimensions corresponding to the surface position parameters $(X_{1r}, X_2)$, one dimension $(X_3)$ corresponding to the offset parameter and one dimension $(X_4)$ corresponding to the time, and in that, with the data coming from an acquisition with a source/receiver distance sampled regularly with a pitch $\Delta_3$ and a time sampled with a pitch $\Delta_4$, the law for projection in the direction of the offset is $$\Pi_P^3(j) = Adj\left(\sqrt{(i_4)^2 \times (\Delta_4)^2 + \frac{(j^2 - (i_3)^2) \times (\Delta_3)^2}{v(i_1, i_2)^2}}\right)$$

where $V(i_1, i_2)$ is a propagation velocity of the wave which is available at the point $(i_i, i_2, i_3)$ of the subsoil and where Adj is the adjustment function for the signal on the current trace of a point of the surface.

13. The method as claimed in claim 1, wherein the initial velocity is varied by a perturbation factor (α) in order to update a velocity model by a velocity scan, and in that n seismic volumes sampled in a direction $(X_3)$ corresponding to the perturbation factor are obtained after the various depth migrations,
   and in that other dimensions taken into account comprise two dimensions corresponding to the surface position parameters $(X_1, X_2)$ and one dimension $(X_4)$ corresponding to the depth of the sample, and in that a law for propagation in the direction corresponding to the propagation factor is of the type:

$$\Pi_P^3(j) = Adj\left(\left(i_4 + \frac{j-i_3}{i_3}\right) \times \Delta_3\right)$$

where $\Delta_3$ is the sampling pitch in this dimension, and where Adj is the adjustment function for the signal on the current trace of a point of the surface.

* * * * *

UNITED STATES PATENT AND TRADEMARK OFFICE
CERTIFICATE OF CORRECTION

PATENT NO. : 8,014,951 B2
APPLICATION NO. : 10/482583
DATED : September 6, 2011
INVENTOR(S) : Talaalout et al.

It is certified that error appears in the above-identified patent and that said Letters Patent is hereby corrected as shown below:

On the Face Page, in Field (54), in Title, in Column 1, Line 2, delete "POINTING" and insert -- PICKING --, therefor.

In Column 1, Line 1, delete "POINTING" and insert -- PICKING --, therefor.

In Column 4, Line 47, delete "(xi, x2 ... xn)" and insert -- $(x_1, x_2 ... x_n)$ --, therefor.

In Column 4, Line 61, delete "x1, $x_2$ ... x," and insert -- $x_1, x_2 ... x_n$, --, therefor.

In Column 8, Line 34, in Claim 11, delete " $\Pi_P^3,(j)=\mathrm{Adj}(i_4)$ ," and insert -- $\Pi_P^3(j) = Adj(i_4)$ --, therefor.

In Column 8, Line 55, in Claim 12, delete "$(i_i, i_2, i_3)$" and insert -- $(i_1, i_2, i_3)$ --, therefor.

Signed and Sealed this
Thirteenth Day of March, 2012

David J. Kappos
*Director of the United States Patent and Trademark Office*